US009966047B2

(12) United States Patent
Gao et al.

(10) Patent No.: US 9,966,047 B2
(45) Date of Patent: May 8, 2018

(54) TIME DISPLAY METHOD AND APPARATUS

(71) Applicant: HUAWEI TECHNOLOGIES CO., LTD., Shenzhen (CN)

(72) Inventors: Wenmei Gao, Beijing (CN); Yahui Wang, Beijing (CN); Hao Jing, Shenzhen (CN); Yan Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 44 days.

(21) Appl. No.: 14/971,102

(22) Filed: Dec. 16, 2015

(65) Prior Publication Data

US 2016/0104461 A1    Apr. 14, 2016

Related U.S. Application Data

(63) Continuation of application No. PCT/CN2014/078132, filed on May 22, 2014.

(51) Int. Cl.
*G09G 5/393* (2006.01)
*G04G 9/00* (2006.01)
(Continued)

(52) U.S. Cl.
CPC ........... *G09G 5/393* (2013.01); *G04G 9/0005* (2013.01); *G04G 21/00* (2013.01); *G06F 1/1684* (2013.01);
(Continued)

(58) Field of Classification Search
None
See application file for complete search history.

(56) References Cited

U.S. PATENT DOCUMENTS

2007/0088225 A1* 4/2007 Tanaka ................. A61B 5/0002
600/503
2010/0167787 A1 7/2010 Weisbrod
(Continued)

FOREIGN PATENT DOCUMENTS

CN    102244699 A    11/2011
CN    102508594 A    6/2012
(Continued)

OTHER PUBLICATIONS

Sieber ("How to Synchronise Your Computer Time With the Internet on a Custom Schedule", 2011, http://www.makeuseof.com/tag/synchronise-computer-time-internet-custom-schedule-windows-7/).*

(Continued)

*Primary Examiner* — Xin Sheng
(74) *Attorney, Agent, or Firm* — Staas & Halsey LLP

(57) ABSTRACT

The present invention relates to a time display method. The method includes: when an electronic device in a standby state detects, by using a first sensor, that a movement track of the electronic device meets a first condition, acquiring current time of the electronic device; generating a clock display user interface UI by using the current time, and saving the clock display UI in a buffer; and displaying, on a screen of the electronic device, the clock display UI in the buffer when the screen of the electronic device is lit up. The present invention resolves a problem that time displayed when a screen of an electronic device is lit up undergoes a rapid change, and reduces power consumption of the electronic device.

16 Claims, 4 Drawing Sheets

(51) Int. Cl.
    *G04G 21/00* (2010.01)
    *G09G 5/395* (2006.01)
    *G06F 1/32* (2006.01)
    *G06F 1/16* (2006.01)
    *G06F 3/01* (2006.01)

(52) U.S. Cl.
    CPC .......... *G06F 1/3218* (2013.01); *G06F 1/3265* (2013.01); *G06F 3/017* (2013.01); *G09G 5/395* (2013.01); *G09G 2330/021* (2013.01); *G09G 2360/18* (2013.01); *Y02B 60/1242* (2013.01); *Y02B 60/32* (2013.01)

(56) References Cited

U.S. PATENT DOCUMENTS

| | | | | |
|---|---|---|---|---|
| 2011/0039605 | A1* | 2/2011 | Choi | H02J 7/0047 455/573 |
| 2012/0264398 | A1 | 10/2012 | Liu et al. | |
| 2013/0300689 | A1* | 11/2013 | Park | G06F 3/041 345/173 |
| 2014/0028539 | A1 | 1/2014 | Newham et al. | |
| 2014/0225660 | A1* | 8/2014 | Cheng | G06F 1/1694 327/509 |
| 2014/0310532 | A1* | 10/2014 | Ali | G06F 21/81 713/189 |

FOREIGN PATENT DOCUMENTS

| | | | |
|---|---|---|---|
| CN | 103399811 A | | 11/2013 |
| CN | 103472913 A | * | 12/2013 |
| CN | 103793075 A | | 5/2014 |

OTHER PUBLICATIONS

Atmel ("ATmega328P powers this slick DIY wristwatch", 2013, https://atmelcorporation.wordpress.com/tag/diy-digital-wristwatch/).*
International Search Report dated Feb. 27, 2015 in corresponding International Patent Application No. PCT/CN2014/078132.
International Search Report dated Feb. 27, 2015, in corresponding International Application No. PCT/CN2014/078132.

* cited by examiner

TIME DISPLAY METHOD AND APPARATUS

CROSS-REFERENCE TO RELATED APPLICATIONS

This application is a continuation of International Application No. PCT/CN2014/078132, filed on May 22, 2014, which is hereby incorporated by reference in its entirety.

TECHNICAL FIELD

The present invention relates to electronics technologies, and in particular, to a time display method and apparatus.

BACKGROUND

Currently, some smartwatches in the industry have a function: with slight rotation of an arm, a screen of a watch is lit up automatically, and time is display on the screen. A principle of the function is as follows: a gravity sensor detects a status of the watch in real time, and when the watch is inclined downward relative to a horizontal plane, and an angle of inclination is greater than an angle threshold (for example, 30°), the screen is lit up automatically.

However, there is one problem: when the screen is lit up, time before the screen is locked is first displayed, and then current time is displayed, resulting in an obvious delay (or an obvious rapid change). The reason is: what is buffered in a framebuffer (FB) of a smartwatch is an original clock display user interface (UI), and only when the screen is lit up, a latest time value is acquired and a latest clock display UI is displayed, causing a rapid time change when the screen is lit up.

In the prior art, a similar problem (that is, a problem of a rapid time change when a screen is lit up) also exists in Android phones. A basic screen locking procedure of an Android system is as follows: When a user presses a power button to lock a screen, the system generates a lock screen UI and buffers the lock screen UI in an FB (note: a clock displays current time), and then the screen goes black, and the system sleeps; when the user presses the power button again, the system is awaken, the screen is lit up, and at this time, the lock screen UI buffered in the FB is displayed (note: the clock still displays the time that is before the screen is locked), and then the system acquires a latest time value, refreshes the lock screen interface, and displays a latest clock value. In the foregoing process, the problem of the rapid time change on a clock (that is, displaying old time before displaying new time) is caused.

There is a solution to the foregoing problem among the Android phones now. For example, in a standby situation, a system periodically acquires a time value and refreshes a lock screen UI. In this way, when a power button is pressed and a screen is lit up, generally, a latest time value is displayed, and the problem of the rapid time change does not occur. However, in the foregoing optimization solution for phones, periodically acquiring time and updating the lock screen UI in a background causes meaningless power consumption, thereby shortening a standby time. Therefore, it is not applicable to electronic devices having an extremely strict requirement on power consumption such as smartwatches.

SUMMARY

An objective of the present invention is to resolve a problem that time displayed when a screen of an electronic device is lit up undergoes a rapid change.

According to a first aspect, an embodiment of the present invention provides a time display method, where the method includes:

when an electronic device in a standby state detects, by using a first sensor, that a movement track of the electronic device meets a first condition, acquiring current time of the electronic device;

generating a clock display user interface UI by using the current time, and saving the clock display UI in a buffer; and displaying, on a screen of the electronic device, the clock display UI in the buffer when the screen of the electronic device is lit up.

With reference to the first aspect, in a first possible implementation manner of the first aspect, that a movement track of the electronic device meets a first condition includes that:

an angle by which the electronic device rotates around a first coordinate axis is greater than a rotation vector threshold or within a predetermined rotation vector threshold range.

With reference to the first aspect, in a second possible implementation manner of the first aspect, that the screen of the electronic device is lit up specifically includes that:

when the electronic device detects that a change in an angle of inclination of the electronic device meets a second condition, the screen of the electronic device is lit up.

With reference to the first aspect, in a third possible implementation manner of the first aspect, the acquiring current time of the electronic device specifically includes:

reading the current time from a clock chip of the electronic device; or acquiring the current time by using a network.

With reference to the first aspect, in a fourth possible implementation manner of the first aspect, after the acquiring current time of the electronic device, the method further includes:

acquiring a current battery level of the electronic device and a display style of the standby interface, where the display style of a standby interface includes a background color of the clock display UI and/or a clock style of the clock display UI; and the generating a clock display user interface UI by using the current time specifically includes:

generating the standby interface according to the display style of the standby interface by using the current time and the current battery level, where the standby interface includes the clock display UI.

With reference to the first aspect, in a fifth possible implementation manner of the first aspect, before or after the saving the clock display UI in a buffer, the method further includes:

locking, by the electronic device, a corresponding area in which the clock display UI is stored and that is in the buffer; and after the displaying, on a screen of the electronic device, the clock display UI in the buffer, the method further includes:

unlocking, by the electronic device, the corresponding area in which the clock display UI is stored and that is in the buffer.

According to a second aspect, an embodiment of the present invention provides a time display apparatus, where the apparatus includes: a detecting unit, an acquiring unit, a processing unit, and a displaying unit, where the detecting unit is configured to: detect a movement track of the electronic device by using a first sensor, and when the movement track of the electronic device meets a first condition, trigger the acquiring unit;

the acquiring unit is configured to acquire current time of the electronic device when triggered by the detecting unit;

the processing unit is configured to: generate a clock display user interface UI by using the current time acquired by the acquiring unit, and save the clock display UI in a buffer; and the displaying unit is configured to display, on a screen of the electronic device, the clock display UI in the buffer when the screen of the electronic device is lit up.

With reference to the second aspect, in a first possible implementation manner of the second aspect, that the movement track of the electronic device meets a first condition includes that:

an angle by which the electronic device rotates around a first coordinate axis is greater than a rotation vector threshold or within a predetermined rotation vector threshold range.

With reference to the second aspect, in a second possible implementation manner of the second aspect, that the screen of the electronic device is lit up specifically includes that: the detecting unit is further configured to: detect a change in an angle of inclination of the electronic device, and when the change in the angle of inclination of the electronic device meets a second condition, light up the screen.

With reference to the second aspect, in a third possible implementation manner of the second aspect, the acquiring unit is specifically configured to read the current time from a clock chip of the electronic device, or acquire the current time by using a network.

With reference to the second aspect, in a fourth possible implementation manner of the second aspect, after acquiring the current time of the electronic device, the acquiring unit is further configured to acquire a current battery level of the electronic device and a display style of a standby interface, where the display style of the standby interface includes a background color of the clock display UI and/or a clock style of the clock display UI; and the displaying unit is specifically configured to generate the standby interface according to the display style of the standby interface by using the current time and the current battery level, where the standby interface includes the clock display UI.

With reference to the second aspect, in a fifth possible implementation manner of the second aspect, before or after saving the clock display UI in the buffer, the processing unit is further configured to lock a corresponding area in which the clock display UI is stored and that is in the buffer; and after the displaying unit displays, on the screen of the electronic device, the clock display UI in the buffer, the processing unit is further configured to unlock the corresponding area in which the clock display UI is stored and that is in the buffer.

According to a third aspect, an embodiment of the present invention provides an electronic device, where the electronic device includes: a first sensor, a central processing unit CPU, a memory, and a display; where the first sensor is configured to: detect a movement track of the electronic device, and when it is detected that the movement track of the electronic device meets a first condition, trigger generation of a first interrupt signal, and send the first interrupt signal to the CPU;

the CPU is configured to: when receiving the first interrupt signal sent by the first sensor, acquire current time of the electronic device, generate a clock display user interface UI by using the current time, and save the clock display UI in a buffer of the memory; and the CPU is further configured to display, on a screen of the display, the clock display UI in the buffer of the memory when the screen of the display is lit up.

With reference to the third aspect, in a first possible implementation manner of the third aspect, that the movement track of the electronic device meets a first condition includes that:

an angle by which the electronic device rotates around a first coordinate axis is greater than a rotation vector threshold or within a predetermined rotation vector threshold range.

With reference to the third aspect, in a second possible implementation manner of the third aspect, the electronic device further includes: a second sensor, configured to detect a change in an angle of inclination of the electronic device, where when detecting that the change in the angle of inclination of the electronic device meets a second condition, the second sensor triggers generation of a second interrupt signal, and sends the second interrupt signal to the CPU; and when receiving the second interrupt signal sent by the second sensor, the CPU lights up the screen of the display.

With reference to the third aspect, in a third possible implementation manner of the third aspect, the CPU is specifically configured to read the current time from a clock chip of the electronic device, or acquire the current time by using a network.

With reference to the third aspect, in a fourth possible implementation manner of the third aspect, after acquiring the current time of the electronic device, the CPU is further configured to acquire a current battery level of the electronic device and a display style of the standby interface, where the display style of a standby interface includes a background color of the clock display UI and/or a clock style of the clock display UI; and the CPU is specifically configured to generate the standby interface according to the display style of the standby interface by using the current time and the current battery level, where the standby interface includes the clock display UI.

With reference to the third aspect, in a fifth possible implementation manner of the third aspect, before or after saving the clock display UI in the buffer, the CPU is further configured to lock a corresponding area in which the clock display UI is stored and that is in the buffer; and after displaying, on the screen of the electronic device, the clock display UI in the buffer, the CPU is further configured to unlock the corresponding area in which the clock display UI is stored and that is in the buffer.

With reference to the third aspect, in a sixth possible implementation manner of the third aspect, the electronic device is a smartwatch, a smart band, or a smart wrist strap.

According to the foregoing solutions, in the present invention, an action (corresponding to a movement track of an electronic device) of a user is detected, and therefore, it can be predicted in advance that the user needs to view time, latest current time is first acquired before a screen is lit up, and the latest current time is displayed after the screen is lit up, thereby resolving a problem that time displayed when a screen of an electronic device is lit up undergoes a rapid change, and reducing power consumption of the electronic device.

DESCRIPTION OF EMBODIMENTS

To make the objectives, technical solutions, and advantages of the present invention clearer, the following further describes the present invention in detail with reference to the accompanying drawings. Apparently, the described embodiments are merely some rather than all of the embodiments of the present invention. All other embodiments obtained by a person of ordinary skill in the art based on the embodiments of the present invention without creative efforts shall fall within the protection scope of the present invention.

In the embodiments of the present invention, an electronic device includes but is not limited to a wearable device having a screen, such as a smartwatch, a smart band, or a smart wrist strap; an operating system (OS) used by the electronic device may include but is not limited to an operating system such as Android, or IOS. Because electronic devices have a same principle, for convenience of description, all the following embodiments use only smartwatches as examples for description. But the examples do not impose any limitation on the protection scope of the present invention.

Figure 1:
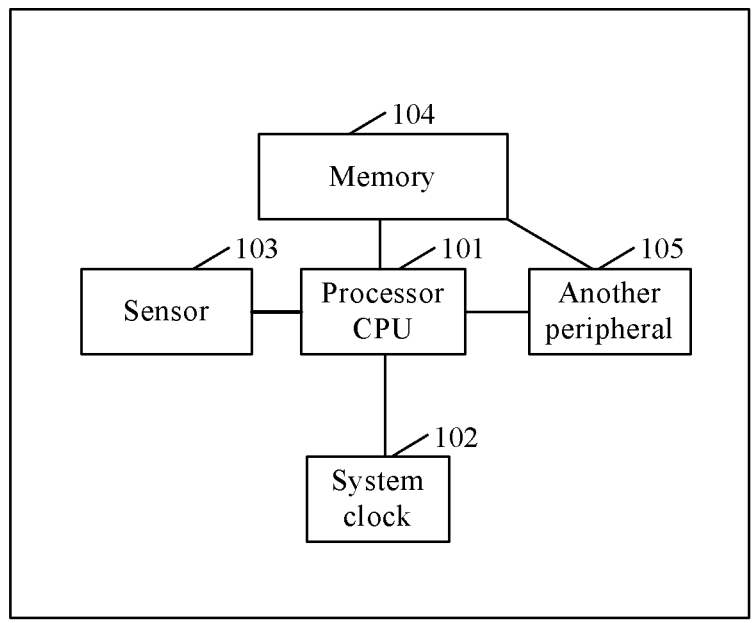
FIG. 1 is a structural diagram of an electronic device according to an embodiment of the present invention.

FIG. 1 is a structural diagram of an electronic device according to an embodiment of the present invention. As shown in FIG. 1, the electronic device includes a central processing unit (CPU) 101, a system clock 102, a sensor 103, a memory 104, and another peripheral 105. Data may be transmitted between the CPU 101 and each of the system clock 102, the sensor 103, the memory 104, and the another peripheral 105.

The memory 104 stores at least one program, where the program includes handlers of the CPU 101. The CPU 101 may execute the handlers to execute a corresponding function.

The handlers of the CPU 101 may include multiple interrupt handling subroutines that can be seen as relatively independent modules, for example, a software module in an operating system OS such as a time display optimization module configured to implement the present invention, a standby interface display module configured to display a standby interface, an automatic screen-lighting module configured to light up a screen, a power management module configured to manage power. When the CPU needs to perform corresponding processing, the CPU only needs to call a corresponding module (an interrupt handling subroutine). For example, when the standby interface needs to be displayed, the standby interface display module is called. To describe an implementation process of the present invention in a more detailed manner, software modules of the OS are described in this embodiment of the present invention. It can be considered that all the software modules are executed by the CPU 101.

The sensor 103 is a micro-electro-mechanical systems (MEMS) sensor.

The memory 104 is configured to store data of an electronic device system. The memory 104 includes a framebuffer (FB) configured to buffer data.

The another peripheral 105 may be a display. The display may be a light-emitting diode (LED) display screen, or may be a (LCD) liquid crystal display screen. A type of the display screen is not limited in the present invention. In this embodiment of the present invention, the electronic device displays time on a screen of the display.

The sensor 103 includes a first sensor. The first sensor is configured to: detect a movement track of the electronic device, and when detecting that the movement track of the electronic device meets a first condition, trigger generation of a first interrupt signal, and send the first interrupt signal to the CPU 101. When receiving the first interrupt signal sent by the first sensor, the CPU 101 starts running the time display optimization module. When running, the time display optimization module acquires current time of the electronic device from the system clock 102, generates a clock display user interface UI by using the current time, and saves the clock display UI in the framebuffer of the memory 104.

After the screen of the display of the electronic device is lit up, the time display optimization module displays, on the screen of the display, the clock display UI in the framebuffer of the memory 104.

That the movement track of the electronic device meets a first condition may include that: an angle by which the electronic device rotates around a first coordinate axis and that is detected by the first sensor is greater than a rotation vector threshold.

The current time refers to time of a moment at which the CPU 101 receives the first interrupt signal and the time display optimization module is triggered by the CPU 101.

The CPU 101 generally saves the clock display UI in the framebuffer, so as to read the saved clock display UI directly from the framebuffer when the screen is lit up. Certainly, in this embodiment and subsequent other embodiments, the clock display UI may also be saved in another buffer; when the screen is lit up, the saved clock display UI is read from the buffer and then is displayed on the framebuffer. In the embodiments of the present invention, directly saving the clock display UI in the framebuffer is used as an example for description.

The screen of the electronic device may be lit up manually, that is, lighting up of the screen is triggered by using a button, and the screen is lit up when a user presses a specific button; or the screen of the electronic device may be lit up automatically, and when it is detected, by using a sensor, that the movement track of the electronic device meets a specified condition, lighting up of the screen is triggered.

Therefore, optionally, the sensor 103 may further include a second sensor. The second sensor is configured to detect a change in an angle of inclination of the electronic device. When detecting that the change in the angle of inclination of the electronic device meets a second condition (for example, exceeding a preset inclination angle threshold), the second sensor triggers generation of a second interrupt signal, and sends the second interrupt signal to the CPU 101.

When receiving the second interrupt signal, the CPU 101 calls the automatic screen-lighting module that is in the OS. When identifying the signal as a signal for lighting up the screen, the automatic screen-lighting module sends a request to the power management module that is in the OS, to request to light up the screen. The display responds to the request and lights up the screen, that is, the screen of the display.

Alternatively, when receiving the second interrupt signal, the CPU 101 sends a first asynchronous event to the time display optimization module. After saving the clock display UI in the framebuffer, the time display optimization module determines whether the first asynchronous event is received, and if the first asynchronous event is received, the time display optimization module requests the CPU to send a request to the power management module that is in the OS, to light up the screen.

Figure 2:
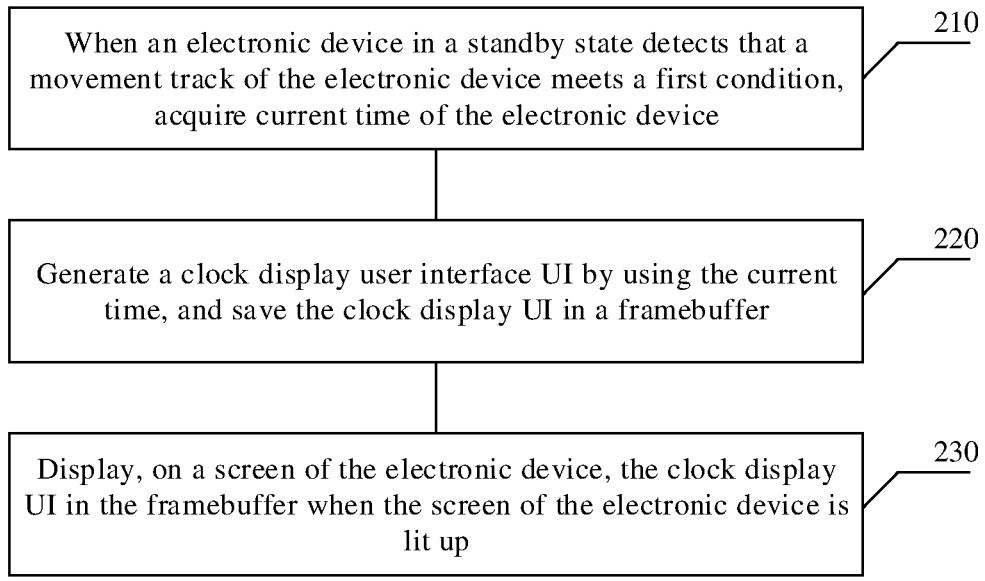
FIG. 2 is a flowchart of a time display method according to Embodiment 1 of the present invention.

The following describes in detail, by using FIG. 2, a processing process of a time display method that is of an electronic device and that is provided by an embodiment of the present invention.

FIG. 2 is a flowchart of a time display method according to an embodiment of the present invention. As shown in FIG. 2, this embodiment includes the following steps:

Step 210: When an electronic device in a standby state detects that a movement track of the electronic device meets a first condition, acquire current time of the electronic device.

The electronic device detects, by using a first sensor, that the movement track of the electronic device meets the first condition. That the movement track of the electronic device meets the first condition may include that: an angle by which the electronic device rotates around a first coordinate axis is greater than a rotation vector threshold, for example, 15°. Certainly, to achieve an objective of power saving, the threshold of the rotation angle may be increased properly, for example, set to over 20°.

The first sensor may be a rotation vector sensor (RV-sensor). The RV-sensor has no directly corresponding physical sensor. Instead, a rotation vector of the RV-sensor needs to be obtained by an acceleration sensor, an orientation sensor (O-sensor), and a gyro sensor (Gyro-sensor) by using an algorithm. Alternatively, the first sensor may also be a gyroscope. When the first sensor is the RV-sensor, a coordinate system in which the RV-sensor is located is a three-dimensional coordinate system, including three coordinate axes: X, Y, and Z. A rotation vector threshold around a preset first coordinate axis is set in advance in the RV-sensor. The preset first coordinate axis may be the Y axis. The rotation vector threshold may be a rotation angle around the Y axis. Using a smartwatch as an example, the smartwatch is worn on an arm of a user. The Y axis is a straight line along the arm on which the user wears the smartwatch. A plane on which a circle formed by a watchband of the smartwatch is located is a plane on which the X axis and the Z axis are located. Rotating a wrist by 10°, 15°, or 20° may be used as the rotation vector threshold. When the RV-sensor detects the movement track of the electronic device, that is, a rotation action of the wrist on which the user wears the watch, and when a rotation angle of the rotation action is greater than the rotation vector threshold, the first sensor generates an interrupt signal. The interrupt signal awakes the CPU in a preset manner, so that the CPU starts working, and the CPU calls a time display optimization module to start working. The interrupt signal awakes the CPU in the preset manner. The preset manner may be generating a high electrical level signal, for example, "1", by means of a hardware pin connection, to trigger the CPU to start working. After the CPU is triggered, the CPU starts running an interrupt handling subroutine. Different interrupt signals are corresponding to different interrupt handling subroutines.

Herein, an interrupt handling subroutine triggered by a work instruction may be named as a time display optimization module, where the work instruction is generated by the CPU according to the interrupt signal sent by the first sensor.

Certainly, the movement track that meets the first condition may also be preset as another action, for example, a manner of shaking around the first coordinate axis. The first coordinate axis herein is also the straight line along the arm on which the user wears the smartwatch.

It should be noted that the rotation action may be not for looking at the watch. For example, the rotation action may be only swinging at a small angle, and the CPU is also triggered, and power consumption increases. Therefore, a proper rotation vector threshold may be chosen to screen out a large number of small actions. For example, the rotation vector threshold may be set to any angle between 15° and 20°. Only when the rotation angle is greater than a corresponding rotation vector threshold set between 15° and 20°, the first sensor generates the interrupt signal. That is, that the first sensor of the electronic device detects that the movement track of the electronic device meets the first condition may include that: the angle by which the electronic device rotates around the first coordinate axis and that is detected by the first sensor of the electronic device is within a predetermined rotation vector threshold range, for example, the rotation vector threshold range is from 15° to 20°.

When running, the time display optimization module may acquire the current time from a hardware chip, for example, the time display optimization module acquires the current time from a clock chip of a system clock; or the time display optimization module may acquire the current time in a software manner, for example, acquiring the current time from a network or by using an application programming interface (API). When the time display optimization module may call the API to acquire the current time, an acquired current time value may be year, month, date, hour, minute, and second information, and display acquired year, month, date, hour, minute, and second on a clock display user interface (UI).

In an embodiment, when an OS is Android, in this case, a process of acquiring the current time by using the API is as follows:
    Time t=new Time( ); // Create a time object instance
    t.setToNow( ); // Obtain current system time
    int year=t.year; // Extract year information
    int month=t.month; // Extract month information
    int date=t.monthDay; // Extract date information
    int hour=t.hour; // Extract hour information
    int minute=t.minute; /// Extract minute information
    int second=t.second; // Extract second information In another embodiment, the time display optimization module reads the current time from the clock chip. There is a random access memory (RAM) in the clock chip. The RAM stores the current time. The time display optimization module reads the current time that is in the RAM.

Step 220: Generate a clock display user interface UI by using the current time, and save the clock display UI in a framebuffer.

The clock display UI is generated according to a clock display style of the electronic device by using the current time acquired in step 210.

Optionally, after the acquiring the current time of the electronic device, the method further includes: acquiring, by the time display optimization module, a current battery level of the electronic device and a display style of a standby interface. The display style of the standby interface includes a background color of the clock display UI and/or a clock style of the clock display UI. Certainly, the standby interface may further include another display style, which may also be acquired and displayed.

The generating the clock display user interface UI by using the current time specifically includes: calling, by the time display optimization module by using the current time and the current battery level, a standby interface display module, to generate the standby interface according to the display style of the standby interface. The standby interface includes the clock display UI.

The time display optimization module saves the clock display UI in the framebuffer FB.

To ensure that UI data saved in the FB is not erased by another program, the time display optimization module may lock (lock) a corresponding area (in an address section of the framebuffer) in which the UI data of the clock display UI is stored and that is in the framebuffer. For example, the time display optimization module uses a memory lock mechanism provided by the OS, that is, obtaining a memory lock of a memory section on which the clock display UI is located, so that the memory section cannot be accessed by another process, thereby locking the clock display UI. The FB may be located in a video RAM of a graphics processing unit (GPU), or may be located in a memory of the OS. When the FB exists in the memory of the OS, the FB may be provided in a manner of memory sharing. A specific locking time may be before storing, or may be after storing. Locking before storing means locking the corresponding area at a time when the corresponding area in which the UI data of the clock display UI is stored has been obtained, which can ensure that only a process in which locking is performed previously can access the area subsequently (before unlocking).

Step 230: Display, on a screen of the electronic device, the clock display UI in the framebuffer when the screen of the electronic device is lit up.

Lighting up the screen of the electronic device may be automatically executed after the movement track of the electronic device meets the first condition, the current time is acquired, and the clock display UI is generated and saved.

Alternatively, lighting up the screen of the electronic device may also be executed only when a second sensor detects a change in an angle of inclination of the electronic device meets a second condition. In the latter case, if the electronic device is the smartwatch worn on the arm of the user, an action of rotating, by the user, the wrist to look at the watch is divided into two actions for determining. One is triggering acquisition of the current time when the first sensor detects that the user rotates the wrist by an angle over 10°, and the other is triggering lighting up of the screen when the second sensor detects that the user rotates the wrist by an angle over 30°. Because the two actions are generally completed consecutively, a time gap between the two actions is very short, and there is an extremely small error between time displayed and time stored, so that time display accuracy is not affected.

In the latter case, that the screen of the electronic device is lit up may include the following two implementation manners:

A first manner:

When the electronic device detects, by using the second sensor of the electronic device, that the change in the angle of inclination of the electronic device meets the second condition (for example, exceeding a preset inclination angle threshold), the screen of the electronic device is lit up.

Specifically, the second sensor detects an angle between the screen of the electronic device and a gravitational acceleration direction. The second sensor may be a gravity sensor (G-sensor). An inclination angle threshold is set in the G-sensor in advance. The inclination angle threshold may be the angle between the screen of the electronic device and the gravitational acceleration direction. When the second sensor detects that the angle between the screen of the electronic device and gravitational acceleration is greater than the inclination angle threshold (the inclination angle threshold is a set angle), the G-sensor generates a specific electrical signal, and the G-sensor sends the electrical signal to the CPU. The CPU calls an automatic screen-lighting module. When identifying the signal as a signal for lighting up the screen, the automatic screen-lighting module sends a request to a power management module, to request to light up the screen. The power management module connects to a power source of a display, and lights up a screen of the display, and the time display optimization module displays, on the screen, the clock display UI in the FB. If before or after the clock display UI is saved in the framebuffer, the corresponding area that is of the clock display UI and in the FB is locked, after the displaying, on the screen, the clock display UI in the FB, the method further includes: unlocking the corresponding area that is of the clock display UI and in the FB, so that the area can store new data. If a timeout situation occurs when the screen waits to be lit up, that is, after the clock display UI is saved in the framebuffer and locking is performed, when timeout occurs before it is detected that the screen is lit up, the electronic device re-enters a dormant state. In this case, the CPU further needs to unlock the corresponding area that is of the clock display UI and in the FB, so that the area can store new data.

Figure 3:
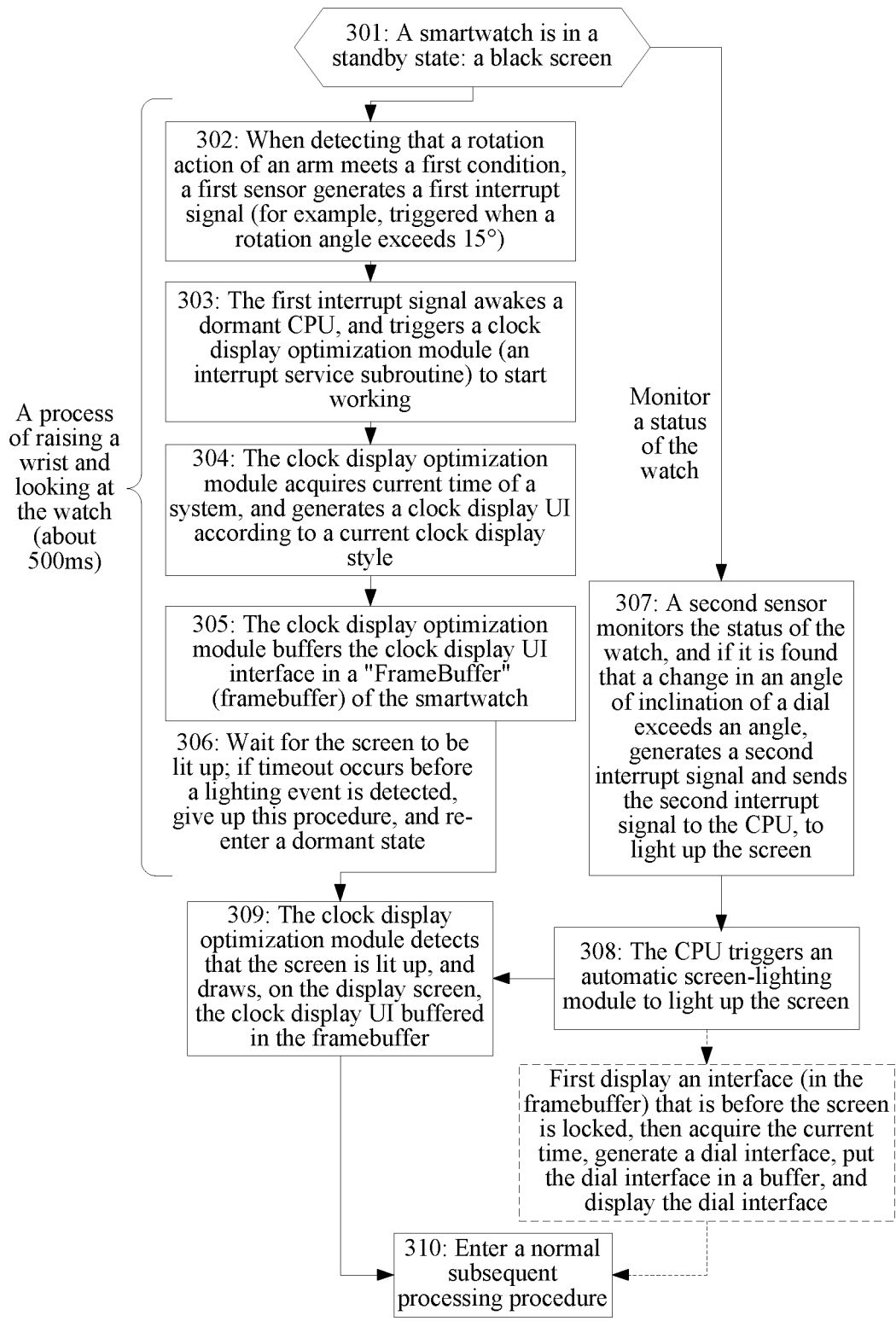
FIG. 3 is a processing flowchart of a time display method according to an embodiment of the present invention.

FIG. 3 is a processing flowchart of a smartwatch time display method according to an embodiment of the present invention. As shown in FIG. 3, the method includes the following steps:

Step 301: A smartwatch is in a standby state, and a screen is a black screen.

Step 302: When detecting that a rotation action of an arm meets a first condition, a first sensor generates a first interrupt signal, where the first sensor is a rotation vector sensor.

The smartwatch is worn on an arm of a user. When the arm of the user rotates, a rotation action of the smartwatch is detected. When the rotation action meets the first condition, for example, when a rotation angle exceeds 15°, generation of the first interrupt signal is triggered.

Step 303: Send the first interrupt signal to a CPU, so that a dormant CPU is awaken, and a clock display module is triggered to start working.

The clock display module is an interrupt service subroutine in an OS.

Step 304: The clock display module acquires current time of a system, and generates a clock display UI according to a current clock display style.

Step 305: The clock display module buffers the clock display UI in a framebuffer of the smartwatch.

Step 306: Wait for the screen to be lit up; if timeout occurs before it is detected that the screen is lit up, give up this procedure, and re-enter a dormant state.

Step 307: A second sensor detects a status of the watch, and if it is found that a change in an angle of inclination of a dial exceeds a specified angle, generates a second interrupt signal and sends the second interrupt signal to the CPU, to light up the screen, where the second sensor is a gravity sensor.

Step 308: The CPU triggers an automatic screen-lighting module to light up the screen.

Step 309: The clock display module detects that the screen is lit up, and draws the clock display UI that is buffered in the framebuffer on the display screen for displaying.

Step 310: Enter a normal subsequent processing procedure.

Alternatively, a second manner:

The electronic device detects, by using the second sensor of the electronic device, whether the change in the angle of inclination of the electronic device exceeds a preset inclination angle threshold, and if the change in the angle of inclination of the electronic device exceeds the preset inclination angle threshold, an asynchronous event is generated, which is called a first asynchronous event.

After the saving the clock display UI in the framebuffer, the time display optimization module determines whether the first asynchronous event is received, and if the time displaying optimization module determines that the first asynchronous event is received, the time display optimization module requests to light up the screen.

Specifically, the second sensor detects an angle between the screen of the electronic device and a gravitational acceleration direction. When the second sensor detects that the angle between the screen of the electronic device and gravitational acceleration is greater than the inclination angle threshold, a gravity sensor generates a specific electrical signal, and sends the electrical signal to the CPU. The CPU sends the first asynchronous event to the time display optimization module. The time display optimization module saves, in the FB, UI data corresponding to the clock display UI, and locks the UI data, and a locking method herein is the same as the foregoing method. When determining that the first asynchronous event is received, the time display optimization module sends a request to a power management module, to request to light up the screen. After the power management module lights up the screen, the time display optimization module displays, on the screen, the clock display UI in the FB. If before or after the clock display UI is saved in the framebuffer, the corresponding area that is of the clock display UI and in the FB is locked, after the displaying, on the screen, the clock display UI in the FB, the method further includes: unlocking the corresponding area that is of the clock display UI and in the FB, so that the area can store new data. If a timeout situation occurs when the screen waits to be lit up, that is, after the clock display UI is saved in the framebuffer and locking is performed, when timeout occurs before it is detected that the screen is lit up, the electronic device re-enters a dormant state. In this case, the CPU further needs to unlock the corresponding area that is of the clock display UI and in the FB, so that the area can store new data.

Figure 4:
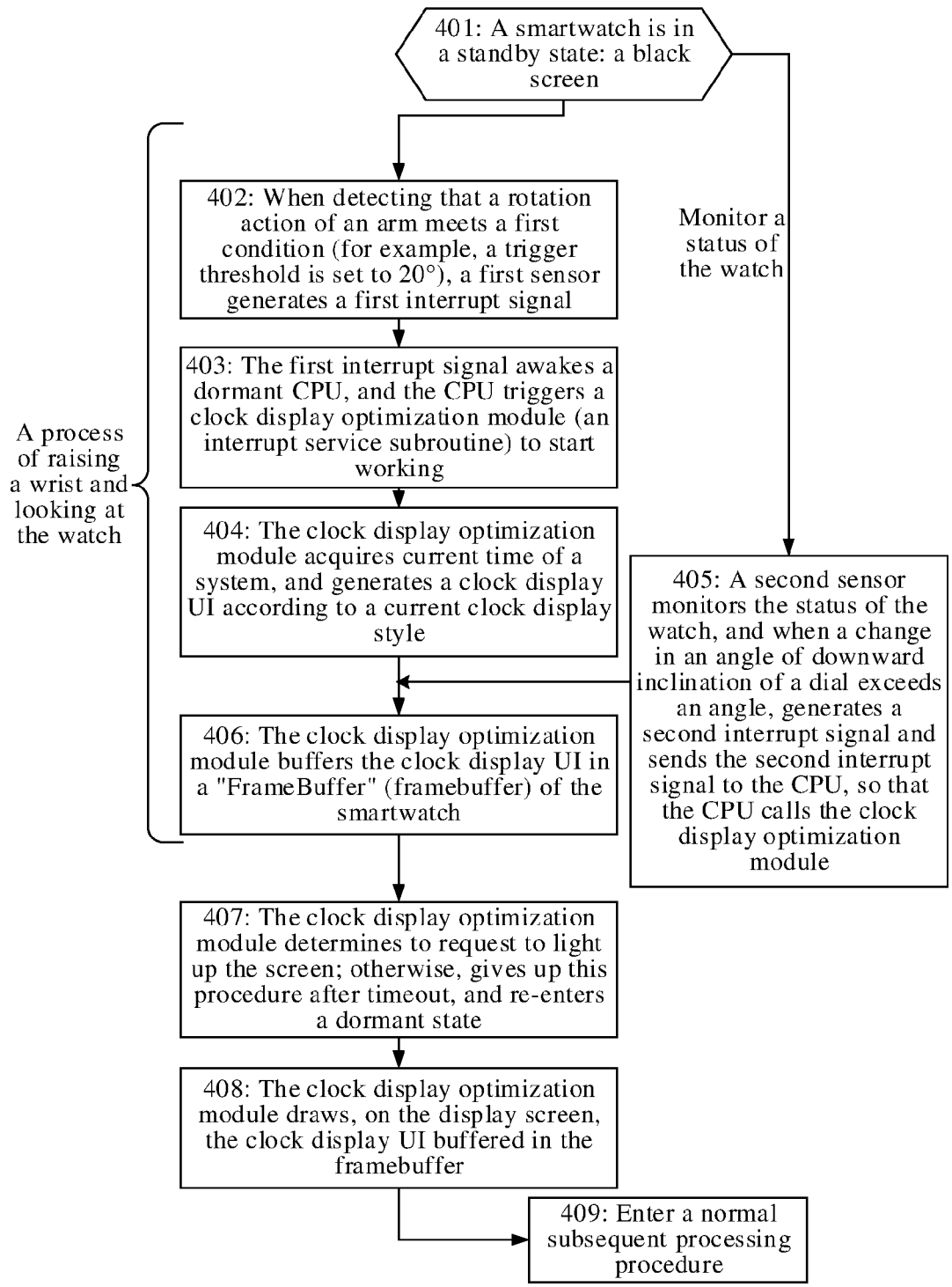
FIG. 4 is a processing flowchart of another time display method according to an embodiment of the present invention.

FIG. 4 is a processing flowchart of another time display method according to an embodiment of the present invention. As shown in FIG. 4, the method includes the following steps:

Step 401: A smartwatch is in a standby state, and a screen is a black screen.

Step 402: When detecting that a rotation action of an arm meets a first condition, a first sensor generates a first interrupt signal.

Step 403: Send the first interrupt signal to a CPU, so that a dormant CPU is awaken, and the CPU calls a clock display module to start working.

Step 404: The clock display module acquires current time of a system, and generates a clock display UI according to a current clock display style.

The foregoing step 401 to step 404 are the same as step 301 to step 304 in FIG. 3, respectively. Details are not described herein again.

Step 405: A second sensor detects a status of the watch, and if it is found that a change in an angle of inclination of a dial exceeds a specified angle, generates a second interrupt signal and sends the second interrupt signal to the CPU, and the CPU calls the clock display module.

Step 406: The clock display module buffers the clock display UI in a framebuffer of the smartwatch.

Step 407: The clock display module determines to request to light up the screen; if the clock display module determines not to request for lighting up the screen, the clock display module gives up this procedure after timeout, and re-enters a dormant state.

Step 408: When detecting that the screen is lit up, the clock display module draws the clock display UI that is buffered in the framebuffer on the display screen for displaying.

Step 409: Enter a normal subsequent processing procedure.

A difference between the foregoing two manners lies in that manners for lighting up the screen are different.

It should be noted that the first sensor and the second sensor may be packaged together by using an MEMS technology, to form an MEMS sensor. A time display optimization module, an automatic screen-lighting module, and a power management module may be integrated in an OS in a form of a software module and stored in a memory, and execute a corresponding function when called by a CPU, or may be integrated in a coprocessor in a hardware encoding manner. The coprocessor may be a Sensor Hub coprocessor, or may be a sensor center. When the coprocessor is a Sensor Hub coprocessor, the coprocessor may acquire, integrate, and process data that is from different sensors, that is, removing such tasks as acquiring, integrating, and processing the data that is from different sensors away from a main application processor, thereby saving power and improving efficiency.

In this embodiment, using a smartwatch as an example, if an arm of a person hangs naturally, an action of raising the arm and looking at the watch while walking generally takes about 500 ms (from raising the arm to being still and looking at the watch); if the arm of the person is put on a table, an action of simply rotating a wrist and looking at the watch generally takes about 300 ms (a wrist rotation process). However, a sampling rate of an MEMS sensor may generally reach several KHz, and a sampling rate of a gyroscope may generally reach 8 KHz, that is, an interval for the gyroscope to perform sampling once is 0.125 ms. Obviously, the MEMS sensor or the gyroscope can accurately identify a wrist rotation action (that is, an action of looking at the watch) of a user. Generally, a rotation angle of the wrist in the action of looking at the watch is from 30° to 90°. In this case, 30° is a minimum value of an angle of inclination of a screen when the screen is lit up. Because if the angle of inclination of the screen is too small, the screen cannot be lit up.

For example, when 30° is used as an inclination angle threshold at which a gravity sensor sends a specific electrical signal, 10° is used as a rotation vector threshold at which a rotation vector sensor sends an interrupt signal. In this way, a first sensor already sends the interrupt signal at ⅓ of a time of an action of the user for looking at the watch (supposing that the time of the action for looking at the watch is 300 ms, ⅓ is 100 ms); a time display optimization module may have adequate time (300 ms*⅔=200 ms) to acquire current time, display current time on a clock display UI, and save, in an FB, UI data corresponding to the clock display UI. In this way, when the gravity sensor detects that an angle between the screen and a gravitational acceleration direction is greater than the inclination angle threshold, the screen is lit up, a latest current time is directly displayed on the screen, and the user feels no delay.

It should be noted that the time display method provided by this embodiment of the present invention is applicable to an electronic device that is lit up by using a button (such as, a mobile phone). Compared with a smartwatch, a difference only lies in a manner of lighting up a screen. When it is detected that a movement track meets a first condition, current time is acquired, and a time display UI is generated and saved in a buffer; when a user lights up the screen by using the button, the time display UI in the buffer is displayed.

Therefore, the time display method provided by this embodiment of the present invention resolves a problem that displayed time undergoes a rapid change when a screen of an electronic device is lit up, and reduces power consumption of the electronic device.

Figure 5:
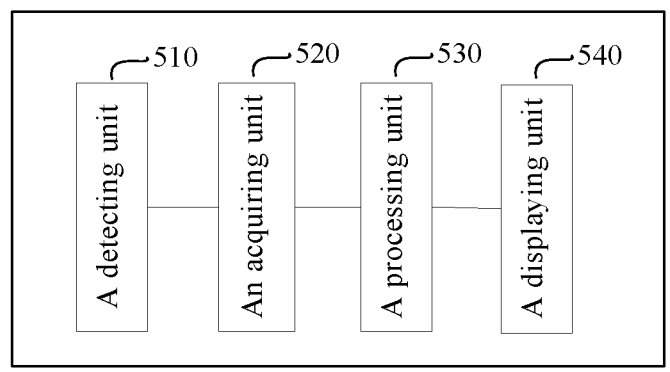
FIG. 5 is a schematic diagram of a time display apparatus according to Embodiment 2 of the present invention.

FIG. 5 is a schematic diagram of a time display apparatus according to Embodiment 2 of the present invention. As shown in FIG. 5, the time display apparatus in this embodiment includes: a detecting unit 510, an acquiring unit 520, a processing unit 530, and a displaying unit 540.

The detecting unit 510 is configured to: detect a movement track of an electronic device, and when the movement track of the electronic device meets a first condition, trigger the acquiring unit 520.

That the movement track of the electronic device meets a first condition specifically includes that: an angle by which the electronic device rotates around a first coordinate axis and that is detected by a first sensor of the electronic device is greater than a rotation vector threshold or within a predetermined rotation vector threshold range.

The acquiring unit 520 is configured to acquire, when triggered by the detecting unit 510, current time of the electronic device.

The acquiring unit 520 is specifically configured to read the current time from a clock chip of the electronic device, or acquire the current time from a network by using an application programming interface API.

The processing unit 530 is configured to: generate a clock display user interface UI by using the current time acquired by the acquiring unit 520, and save the clock display UI in a framebuffer.

The displaying unit 540 is configured to display, on a screen of the electronic device, the clock display UI in the framebuffer when the screen of the electronic device is lit up.

That the screen of the electronic device is lit up specifically includes that:
  a second sensor of the electronic device detects whether a change in an angle of inclination of the electronic device exceeds a preset inclination angle threshold, and if the change in the angle of inclination of the electronic device exceeds the preset inclination angle threshold, the screen is lit up, or
  a second sensor of the electronic device detects whether a change in an angle of inclination of the electronic device exceeds a preset inclination angle threshold, and if the change in the angle of inclination of the electronic device exceeds the preset inclination angle threshold, an asynchronous event is generated, which is called a first asynchronous event.

After saving the clock display UI in the framebuffer, the processing unit 530 determines whether the first asynchronous event is received, and if the first asynchronous event is received, the screen is lit up.

Optionally, after acquiring the current time of the electronic device, the acquiring unit 520 is further configured to acquire a current battery level of the electronic device and a display style of a standby interface. The display style of the standby interface includes a background color of the clock display UI and/or a clock style of the clock display UI.

The displaying unit 540 is specifically configured to: call a standby interface display module by using the current time and the current battery level, and generate the standby interface according to the display style of the standby interface. The standby interface includes the clock display UI.

Optionally, before or after saving the clock display UI in the framebuffer, the processing unit 530 is further configured to lock a corresponding area in which the clock display UI is stored and that is in the framebuffer.

After the displaying unit 540 displays, on the screen of the electronic device, the clock display UI in the framebuffer, the processing unit 530 is further configured to unlock the corresponding area in which the clock display UI is stored and that is in the buffer.

A function of each foregoing unit may be corresponding to a processing step of the foregoing time display method described in detail in FIG. 2. Details are not described herein again.

Therefore, application of the time display apparatus provided by this embodiment of the present invention resolves a problem that time displayed when a screen of an electronic device is lit up undergoes a rapid change, and reduces power consumption of the electronic device.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A time display method, wherein the method comprises:
when an electronic device in a standby state detects, by using a first sensor, that a movement track of the electronic device meets a first condition, acquiring current time of the electronic device;
generating a clock display user interface UI by using the current time, and saving the clock display UI in a buffer; and
displaying, on a screen of the electronic device, the clock display UI in the buffer when the screen of the electronic device is lit up,
wherein that a movement track of the electronic device meets a first condition comprises:
an angle by which the electronic device rotates around a first coordinate axis is greater than a rotation vector threshold or within a predetermined rotation vector threshold range, and
wherein the predetermined rotation vector threshold range is 15° to 20°.

2. The time display method according to claim 1, wherein that the screen of the electronic device is lit up comprises:
when the electronic device detects, by using a second sensor of the electronic device, that a change in an angle of inclination of the electronic device meets a second condition, the screen of the electronic device is lit up.

3. The time display method according to claim 2, wherein the change in the angle of inclination of the electronic device is greater than 30°.

4. The time display method according to claim 1, wherein the acquiring current time of the electronic device comprises:
reading the current time from a clock chip of the electronic device; or acquiring the current time by using a network.

5. The time display method according to claim 1, after the acquiring current time of the electronic device, the method further comprises:
acquiring a current battery level of the electronic device and a display style of a standby interface, wherein the display style of the standby interface comprises a background color of the clock display UI and/or a clock style of the clock display UI; and
the generating a clock display user interface UI by using the current time comprises:
generating the standby interface according to the display style of the standby interface by using the current time and the current battery level, wherein the standby interface comprises the clock display UI.

6. The time display method according to claim 1, before or after the saving the clock display UI in a buffer, the method further comprises:
locking, by the electronic device, a corresponding area in which the clock display UI is stored and that is in the buffer; and
after the displaying, on a screen of the electronic device, the clock display UI in the buffer, the method further comprises:
unlocking, by the electronic device, the corresponding area in which the clock display UI is stored and that is in the buffer.

7. The time display method according to claim 1, wherein the buffer comprises a frame buffer.

8. The time display method according to claim 1, wherein the buffer comprises a memory lock of a memory section in which the clock display UI is saved.

9. The time display method according to claim 1, wherein the buffer is located in RAM.

10. The time display method according to claim 1, wherein the angle by which the electronic device rotates around the first coordinate axis is greater than 10°.

11. An electronic device, wherein the electronic device comprises: a first sensor, a central processing unit CPU, a memory, and a display; wherein
the first sensor is configured to: detect a movement track of the electronic device, and when it is detected that the movement track of the electronic device meets a first condition, trigger generation of a first interrupt signal, and send the first interrupt signal to the CPU;
the CPU is configured to: when receiving the first interrupt signal sent by the first sensor, acquire current time of the electronic device, generate a clock display user interface UI by using the current time, and save the clock display UI in a buffer of the memory; and
the CPU is further configured to display, on a screen of the display, the clock display UI in the buffer of the memory when the screen of the display is lit up,
wherein the electronic device further comprises: a second sensor, configured to detect a change in an angle of inclination of the electronic device, wherein when detecting that the change in the angle of inclination of the electronic device meets a second condition, the second sensor triggers generation of a second interrupt signal, and sends the second interrupt signal to the CPU; and
when receiving the second interrupt signal sent by the second sensor, the CPU lights up the screen of the display.

12. The electronic device according to claim 11, wherein that the movement track of the electronic device meets a first condition comprises:
an angle by which the electronic device rotates around a first coordinate axis is greater than a rotation vector threshold or within a predetermined rotation vector threshold range.

13. The electronic device according to claim 11, wherein the CPU is configured to read the current time from a clock chip of the electronic device, or acquire the current time by using a network.

14. The electronic device according to claim 11, wherein after acquiring the current time of the electronic device, the CPU is further configured to acquire a current battery level of the electronic device and a display style of a standby interface, wherein the display style of the standby interface comprises a background color of the clock display UI and/or a clock style of the clock display UI; and
the CPU is configured to generate the standby interface according to the display style of the standby interface by using the current time and the current battery level, wherein the standby interface comprises the clock display UI.

15. The electronic device according to claim 11, wherein before or after saving the clock display UI in the buffer, the CPU is further configured to lock a corresponding area in which the clock display UI is stored and that is in the buffer; and
after displaying, on the screen of the electronic device, the clock display UI in the buffer, the CPU is further configured to unlock the corresponding area in which the clock display UI is stored and that is in the buffer.

16. The electronic device according to claim 11, wherein the electronic device is a smartwatch, a smart band, or a smart wrist strap.

\* \* \* \* \*